United States Patent [19]
Shiokama

[11] Patent Number: 6,085,041
[45] Date of Patent: Jul. 4, 2000

[54] AUTOFOCUS SYSTEM AND PHOTOGRAPHIC LENS

[75] Inventor: Yoshiharu Shiokama, Chiba-ken, Japan

[73] Assignee: Nikon Corporation, Tokyo, Japan

[21] Appl. No.: 09/241,063

[22] Filed: Feb. 1, 1999

[30] Foreign Application Priority Data

Jan. 30, 1998 [JP] Japan ................................ 10-018508

[51] Int. Cl.$^7$ .............................................. G03B 17/00
[52] U.S. Cl. ............................... 396/75; 396/82; 396/85
[58] Field of Search .................................. 396/72, 75, 79, 396/80, 81, 82, 84, 85, 87

[56] References Cited

U.S. PATENT DOCUMENTS

| | | | |
|---|---|---|---|
| 4,841,325 | 6/1989 | Hoshino et al. | 396/75 |
| 5,231,441 | 7/1993 | Hata | 396/82 |
| 5,687,403 | 11/1997 | Ohtake | 396/82 |
| 5,765,051 | 6/1998 | Watanabe | 396/87 |

Primary Examiner—Russell Adams

[57] ABSTRACT

An autofocus system and photographic lens to convert a residual defocus amount which is corrected on the camera body side into an appropriate residual drive amount on the photographic lens side. The autofocus system includes, on the camera body side, a focus detection device to detect a defocus amount of a photographic lens, a lens movement information acquisition device to acquire lens movement information, a within-camera correction device to determine a residual defocus amount, correcting the lens movement after focus detection based on relational information representing a relationship between the defocus amount and the lens drive amount and movement information, and an information transmission device to transmit the residual defocus amount to the lens side. The autofocus system also includes, on the lens side, a within-lens conversion device to convert the residual defocus amount into a residual drive amount using the coefficient information used by the within-camera correction device, and a lens drive device to drive the lens according to the residual drive amount.

20 Claims, 6 Drawing Sheets

AUTOFOCUS SYSTEM AND PHOTOGRAPHIC LENS

CROSS-REFERENCE TO RELATED APPLICATIONS

This application is based upon and claims priority of Japanese Patent Application No. 10-018508 filed Jan. 30, 1998, the contents being incorporated herein by reference.

BACKGROUND OF THE INVENTION

1. Field of the Invention

The present invention relates to an autofocus system to perform focus control of a photographic lens, and, more particularly, the present invention relates to an autofocus system including a detachable photographic lens having a drive mechanism for focus control and including a camera body having a focus detection unit.

2. Description of the Related Art

An autofocus system is known, for example, as disclosed in Japanese Laid-Open Patent Publication JP-A-63-304223, which simultaneously carries out in parallel an operation of detecting a defocus amount (the displacement amount of a photographic plane and an image plane) and the drive operation of a lens. In the known autofocus system, the detected value of the defocus amount has to be corrected by the extent of the lens movement after the focus detection. The correction of the detected defocus amount is referred to as "autofocus correction" hereinbelow.

Conventionally, the autofocus correction is performed on the camera body side by the following operations (1)–(3).

(1) Firstly, a defocus amount DF1 determined by a focus detection unit is converted into a drive amount Z1 of the focusing lens within the photographic lens.

(2) Secondly, from the drive amount Z1 of the focusing lens, the actual residual drive amount Z3 is calculated (referred to hereinbelow as "residual drive amount") to reduce the lens movement after focus detection Z2.

(3) Finally, the residual drive amount Z3 is converted into a residual defocus amount DF3 in proportion to a conversion coefficient A (i.e., a ratio of drive amount to defocus amount).

The corrected residual defocus amount DF3 is transmitted to the photographic lens side. On the photographic lens side, a residual drive amount Z3' is calculated by multiplying the residual defocus amount DF3 by a conversion coefficient A'. The residual drive amount Z3' is a standard drive value of the focusing lens. The drive mechanism in the photographic lens successively carries out position control or speed control of the focusing lens according to the residual drive amount Z3'.

Furthermore, the coefficients A, A' are values which change moment by moment according to the lens movement. Because of the change of the coefficients A, A', in the photographic lens, data are provided beforehand which indicate the corresponding relationship between the lens position and the conversion coefficient. By referring to the data showing the relationship between lens position and the respective conversion coefficient, a new conversion coefficient can be obtained based on the actual lens position.

However, in the above-described prior art, both the photographic lens side and camera body side acquire the conversion coefficients A, A' independently. Because of the independent acquisition of the conversion coefficients A, A', the conversion coefficient A used on the camera body side and the conversion coefficient A' used on the photographic lens side do not necessarily agree.

Normally, in the case of a whole extension type of photographic lens, the change of the conversion coefficient with lens position is small. Because of the small change of conversion coefficient with the whole extension type photographic lens, the difference between the conversion coefficients A, A' is negligible to a sufficient degree, and focus inaccuracy and the like disadvantages do not arise.

However, in the case of an internal focusing zoom lens or the like, the change of the conversion coefficient with lens position is large. Because of the large change of conversion coefficient when the lens position of the internal focusing zoom lens changes, the conversion coefficients A, A' become greatly displaced between the times of acquisition of the conversion coefficients A, A'.

When the conversion coefficient A and the conversion coefficient A' are greatly displaced in the above-described manner, an inconsistency arises between the actual residual drive amount Z3 found on the camera body side and the residual drive amount Z3' which is actually used in focus control on the photographic lens side. Because of the inconsistency between Z3 and Z3', when using an internal focusing zoom lens or the like, focusing accuracy decreases, focus detection becomes delayed, and the like problems arise.

SUMMARY OF THE INVENTION

It is an object of the present invention to solve the above problems of the prior art autofocus systems, and to provide an autofocus system to convert a residual defocus amount, which has carried out overlap correction on the camera body side, into an appropriate residual drive amount on the photographic lens side.

It is another object of the present invention to provide a photographic lens having an autofocus system to convert a residual defocus amount transmitted from the camera body side into an appropriate residual drive amount.

Objects and advantages of the present invention are achieved in accordance with embodiments of the present invention with an autofocus system comprising a camera body side including a focus detection device to detect a defocus amount of a photographic lens; a lens movement information acquisition device to acquire, from a photographic lens side, movement information relating to a focusing lens within the photographic lens; a within-camera correction device to determine a residual defocus amount, and to correct the defocus amount by the movement of the focusing lens after the time point of focus detection, using the movement information relating to the focusing lens and relational information representing a relationship between the defocus amount and the drive amount of the focusing lens; an information transmission device to transmit to the photographic lens side the corrected residual defocus amount determined by the within-camera correction device; and a photographic lens side including a within-lens conversion device to convert the residual defocus amount transmitted from the information transmission device into the residual drive amount of the focusing lens, using the same relational information as the relational information used by the within-camera correction device, and a lens drive device to drive the focusing lens according to the residual drive amount converted by the within-lens conversion device.

In accordance with embodiments of the present invention, the within-camera correction device and the within-lens conversion device invariably use the same value of the coefficient information. Accordingly, inconsistency in the residual drive amount can be prevented from occurring because of the independent conversion processes on the photographic lens side and the camera body side.

In accordance with embodiments of the present invention, the within-camera correcting device includes a first conversion device to convert the defocus amount detected by the focus detection device into the drive amount of the focusing lens using first relational information at the focus detection time point; a residual drive amount correction device to correct the drive amount converted by the first conversion device by the movement of the focusing lens at the focusing time point and thereafter; a second conversion device to convert the residual defocus amount corrected by the residual drive amount correction device into a residual defocus amount using second relational information at the correction time point, wherein the within-lens conversion device converts the residual defocus amount transmitted from the information transmission device into the residual drive amount of the focusing lens using the second relational information used by the second conversion device.

In the autofocus system in accordance with embodiments of the present invention, correction calculation of the defocus amount is executed in the camera body side in accordance with the following operations (1)–(3).

(1) Firstly, the first conversion device converts the defocus amount into the drive amount of the focusing lens using the relational information (first relational information) at the time of focus detection.

(2) Next, the residual drive amount correction device determines a residual drive amount from the drive amount of the focusing lens, eliminating the movement of the focusing lens after the time of focus detection.

(3) The second conversion device then converts the residual drive amount into a residual defocus amount using the relational information (second relational information) at the time of correction.

The within-lens conversion device on the photographic lens side converts back the residual defocus amount obtained in operation (3) above into a residual drive amount of the focusing lens using the second relational information. Accordingly, on the lens side, the same residual drive amount as the residual drive amount found in the above operation (2) on the camera body side can be invariably obtained.

Objects and advantages of the present invention are achieved in accordance with embodiments of the present invention with a photographic lens comprising a photographic optical system having a focusing lens; a within-lens conversion device to convert a residual defocus amount acquired from the camera body side into a residual drive amount of the focusing lens using relational information representing a relationship between a defocus amount and a drive amount of the focusing lens used when determining a residual defocus amount from a defocus amount on the camera body side; and a lens drive device to drive the focusing lens according to the residual drive amount converted by the within-lens conversion device.

In accordance with embodiments of the present invention, the photographic lens includes a within-lens conversion device to convert the residual defocus amount acquired from the camera body side into the residual drive amount of the focusing lens using the relational information representing the relationship between the defocus amount and the drive amount of the focusing lens used in the camera body side when converting the residual drive amount into the residual defocus amount.

BRIEF DESCRIPTION OF THE DRAWINGS

These and other objects and advantages of the invention will become apparent and more readily appreciated from the following description of the preferred embodiments, taken in conjunction with the accompanying drawings of which.

DETAILED DESCRIPTION OF THE PREFERRED EMBODIMENTS

Figure 1:
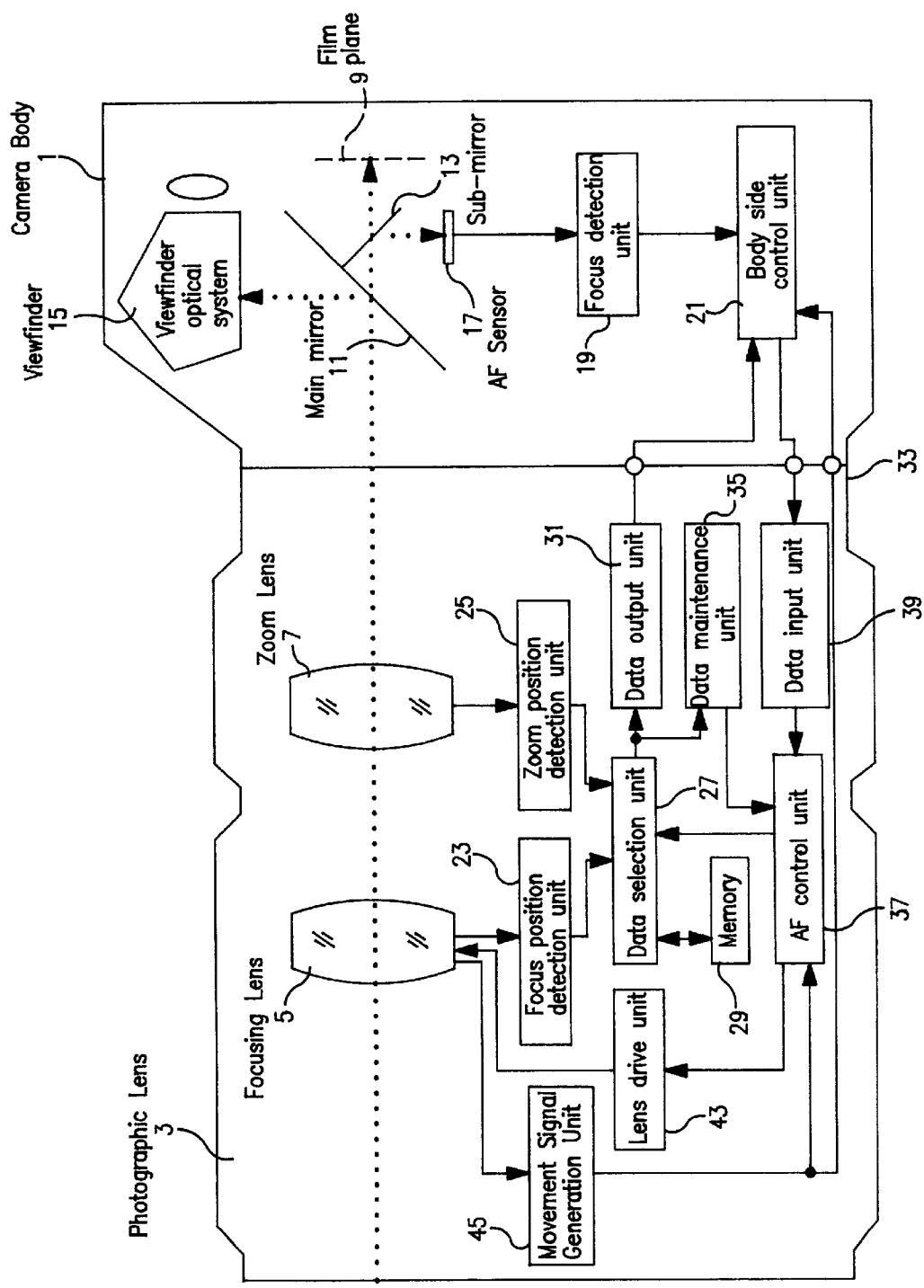
FIG. 1 is a block diagram of an autofocus system in accordance with a first embodiment of the present invention.

Reference will now be made in detail to the preferred embodiments of the present invention, examples of which are illustrated in the accompanying drawings, wherein like reference numerals refer to like elements throughout.

First Preferred Embodiment

Figure 2:
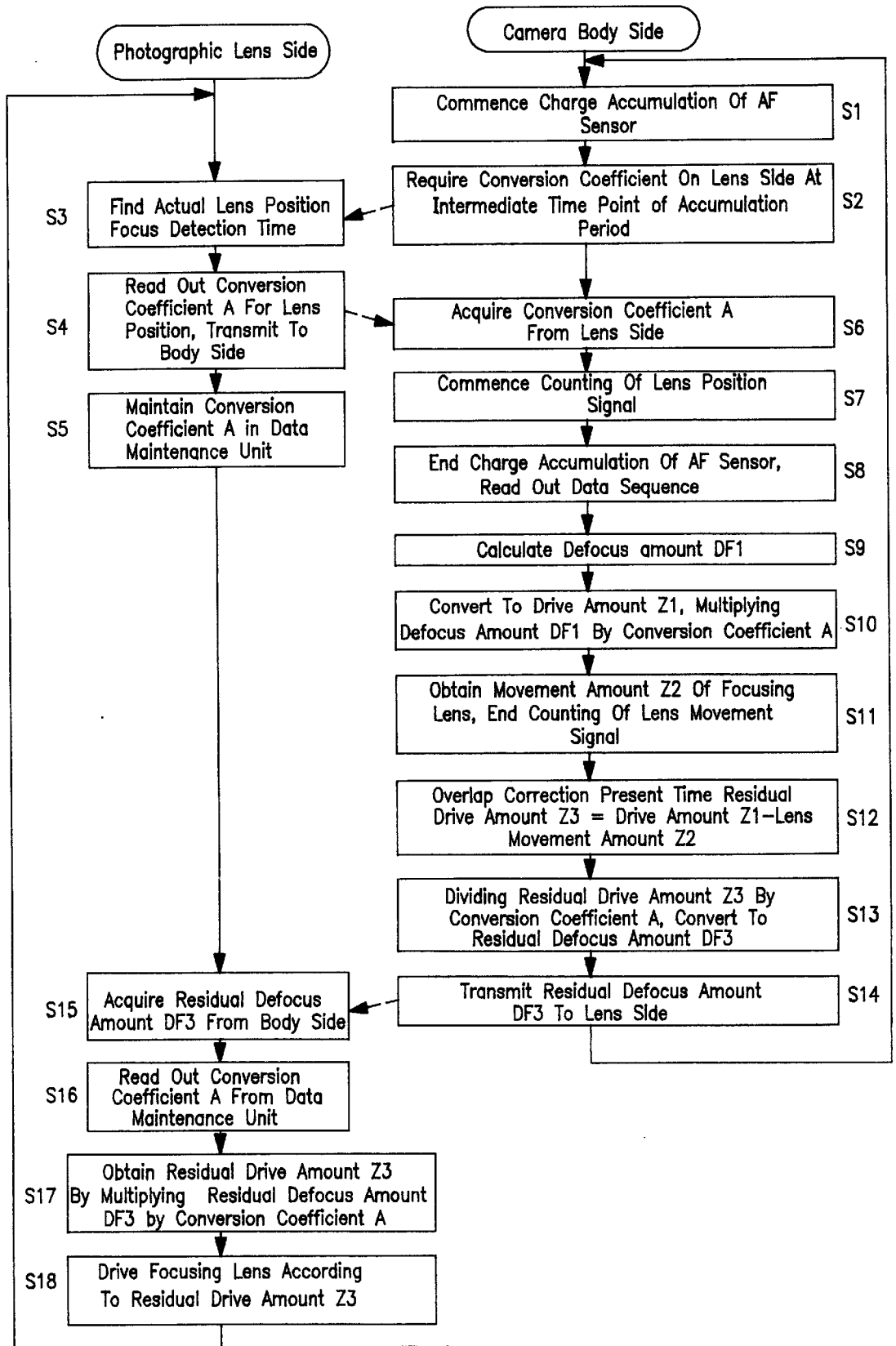
FIG. 2 is a flow chart illustrating an operational process for performing autofocus in accordance with the first embodiment of the present invention.

A first preferred embodiment of the invention will be described below with reference to FIGS. 1–3. FIG. 1 is a block diagram of an autofocus system in accordance with the first preferred embodiment of the present invention.

As shown in FIG. 1, a detachable photographic lens 3 is installed on a camera body 1. The detachable photographic lens 3 is electrically connected to the camera body 1 via electrical contact points 33 on a mounting surface. Signal transmission from the camera to the lens and from the lens to the camera is performed via the contact points 33. The detachable photographic lens 3 includes a focusing lens 5, a zoom lens 7, and other lens group(s) arranged within the photographic lens 3. A main mirror 11, a sub-mirror 13, and a film plane 9 are arranged in the camera body 1 along the optical axis of the lens groups 5, 7.

An autofocus (AF) sensor 17 is arranged in the reflection direction of the sub-mirror 13. The output of the AF sensor 17 is connected to a body side control unit 21 via a focus detection unit 19 which performs focus detection calculations. Information relating to focus control output from the body side control unit 21 is transmitted to an AF control unit 37 via a data input unit 39 of the photographic lens 3.

The detachable photographic lens 3 includes arranged therein a focus position detection unit 23 to detect the absolute position of the focusing lens 5, and a zoom position detection unit 25 to detect the position of the zoom lens 7. The outputs of the position detection units 23, 25 are connected to a data selection unit 27. Lens information (for example, focal distance information, photographic distance information, and conversion coefficient information, etc.) is stored in a memory 29 connected to the data selection unit 27.

Lens information output from the data selection unit 27 is transmitted to the body side control unit 21 via a data output unit 31. Moreover, at this time, lens information transmitted to the body side control unit 21 is also transmitted to a data maintenance unit 35 within the photographic lens 3, and is successively recorded as lens information directly before it is transmitted.

The output data of the data maintenance unit 35 is sent to an AF control unit 37. The AF control unit 37 controls a lens drive unit 43 to drive the focusing lens 5 back and forth. A movement signal generation unit 45 comprising an encoder or the like is disposed in the drive system of the focusing lens 5. The lens movement signal of the movement signal generation unit 45 is transmitted to the AF control unit 37 and to the body side control unit 21, respectively.

The operation of the autofocus device in accordance with the first preferred embodiment of the present invention will now be described below with reference to FIGS. 2 and 3. FIG. 2 is a flow chart illustrating an operational process for performing autofocus in accordance with the first embodiment of the invention. FIG. 3 is a graph showing a relationship between the defocus amount and the drive amount in accordance with the first embodiment of the present invention.

Firstly, in step S1, the body side control unit 21 instructs commencement of electric charge accumulation in the AF sensor 17 via the focus detection unit 19.

At an intermediate time point within the electric charge accumulation period, the body side control unit 21 requires a conversion coefficient for the AF control unit 37 of the photographic lens 3 side (step S2). The intermediate time point is referred to hereinbelow as the "focus detection time point".

On the photographic lens 3 side, the AF control unit 37 instructs the generation of a conversion coefficient for the data selection unit 27. In response to the instruction to generate the conversion coefficient, firstly, the lens positions of the focusing lens 5 and the zoom lens 7 are acquired by the data selection unit 27 from the focus position detection unit 23 (step S3).

The data selection unit 27 determines a conversion coefficient A for the lens position at the focus detection time point based on the lens position, referring to a data table in the memory 29. The conversion coefficient A is then transmitted to the camera body 1 side via the data output unit 31 (step S4). The data selection unit 27 temporarily maintains the value of the conversion coefficient A in the data maintenance unit 35 in parallel with the transmission operation (step S5). Furthermore, the conversion coefficient A here is the value corresponding to the tangent value of the angle θa shown in FIG. 3.

The body side control unit 21 on the camera body 1 side acquires the conversion coefficient A and other lens data transmitted in the above-described manner (step S6). In the body side control unit 21, the counting of lens movement signals which are output on occasion from the movement signal generating unit 45 begins in parallel with the operation of transmitting the conversion coefficient A (step S7). The lens movement signal is a positive and negative 2-phase pulse signal which is output according to the forward and backward movement of the focusing lens 5. Because the lens movement signal is a pulse signal, by counting the lens movement signal, the movement position of the focusing lens 5 after the beginning of counting can be detected from the units of the pulse number.

Continuing, when a predetermined electric charge accumulation period in the AF sensor 17 ends, the focus detection unit 19 reads out a data series showing a pair of optical image patterns from the AF sensor 17 (step S8).

The focus detection unit 19 carries out correlation calculations on the data series to calculate the value of the defocus amount at the time point of focus detection (step S9). The defocus amount at this time corresponds to the defocus amount DF1 shown in FIG. 3.

The body side control unit 21 then multiplies the defocus amount DF1 by the conversion coefficient A, as in Equation (1) below, to calculate the drive amount Z1 necessary to drive the focusing lens 5 to the focus point (step S10).

$$Z1 = DF1 \times A \tag{1}$$

Furthermore, the units of the drive amount Z1 calculated here are the same units as the pulse number of the lens movement signal.

Figure 3:
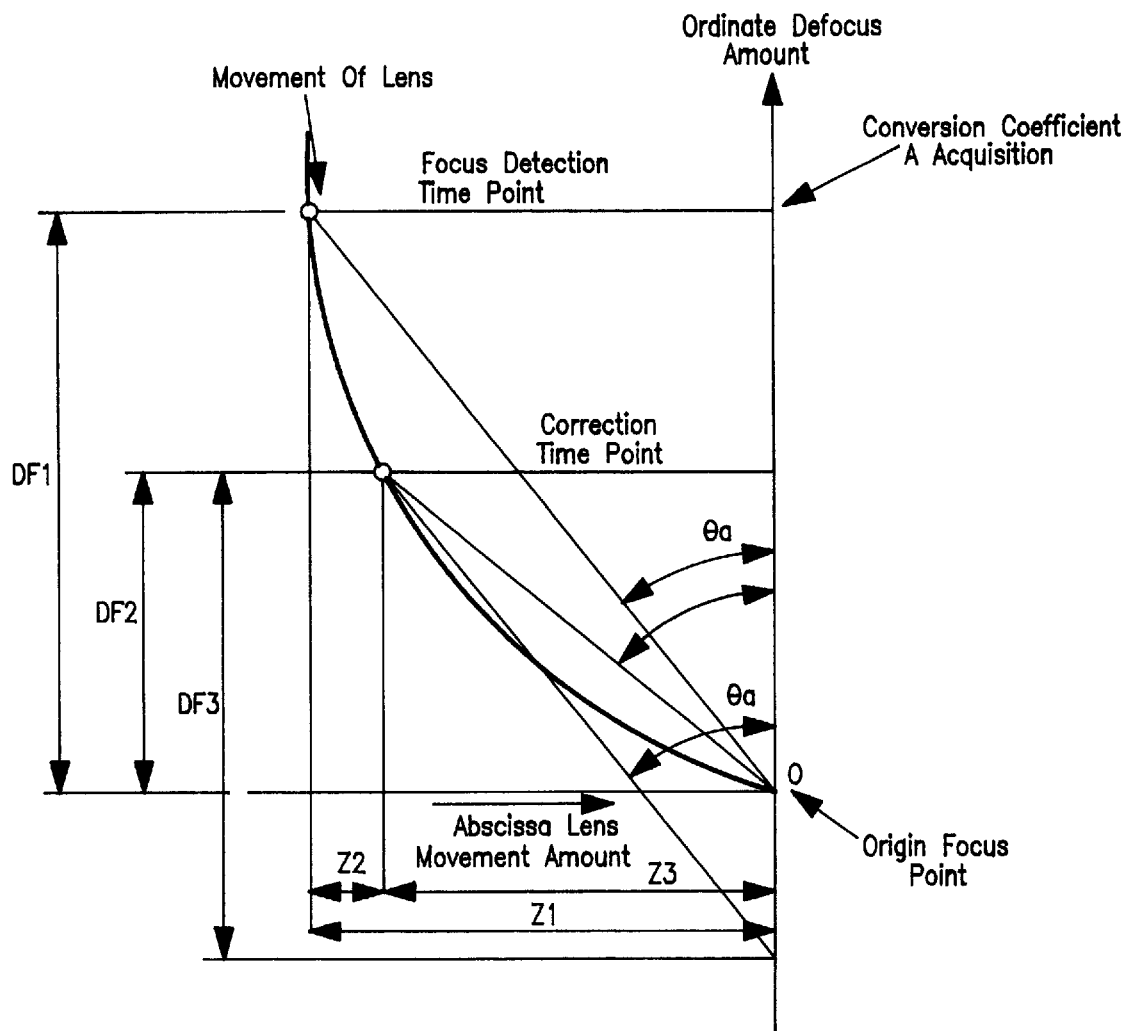
FIG. 3 is a graph illustrating a relationship between the defocus amount and the drive amount in accordance with the first embodiment of the present invention.

At this point in time, the body side control unit 21 ends counting of the pulse movement signal, and, as shown in FIG. 3, determines the lens movement amount Z2 after the focus detection time point (step S11).

The body side control unit 21 then determines the residual drive amount Z3 at the correction time point by subtracting the lens movement amount Z2 after the focus detection time point from the drive amount Z1, as in Equation (2) below (step S12).

$$Z3 = Z1 - Z2 \tag{2}$$

Next, the body side control unit 21 divides the residual drive amount Z3 by the conversion coefficient A, and converts the residual drive amount Z3 into a residual defocus amount DF3, as shown in FIG. 3, as in Equation (3) below (step S13).

$$DF3 = Z3/A \tag{3}$$

The body side control unit 21 transmits the residual defocus amount DF3 to the photographic lens 3 side (step S14). On the photographic lens 3 side, the AF control unit 37 acquires the residual defocus amount DF3 (step S15). The AF control unit 37 then reads out the conversion coefficient A maintained in the data maintenance unit 35 (step S16).

Continuing, the AF control unit 37 determines the residual drive amount Z3 by multiplying the residual defocus amount DF3 by the conversion coefficient A, as in Equation (4) below (step S17).

$$Z3 = DF3 \times A \tag{4}$$

The AF control unit 37 controls the lens drive unit 43 to drive the focusing lens 5 in a direction which reduces the residual drive amount Z3 (step S18).

After repeatedly executing the above operations, at the time point when the count result of the lens movement signal which is output from the movement signal generating unit 45 is equal to the residual drive amount Z3, the AF control unit 37 stops driving the lens.

In accordance with the operations described hereinabove with respect to the first preferred embodiment, because the data maintenance unit 35 maintains the conversion coefficient A, the conversion coefficient A used in step S13 and the conversion coefficient A used in step S17 invariably coincide.

Accordingly, even in the case in which there is a large change in the value of the conversion coefficient according to the lens position, an inconsistency never arises between the residual drive amount Z3 found on the camera body 1 side and the photographic lens 3 side. Therefore, it is possible to execute precise automatic focus control on the photographic lens 3 side based on the accurate residual drive amount Z3 found on the camera body side 1.

Second Preferred Embodiment

A second preferred embodiment of the present invention will now be described below. The elements of the second preferred embodiment of the invention which are the same as or similar to the elements of the first preferred embodiment shown in FIG. 1 are referred to by the same reference elements, and a detailed description of like elements is omitted here.

Figure 4:
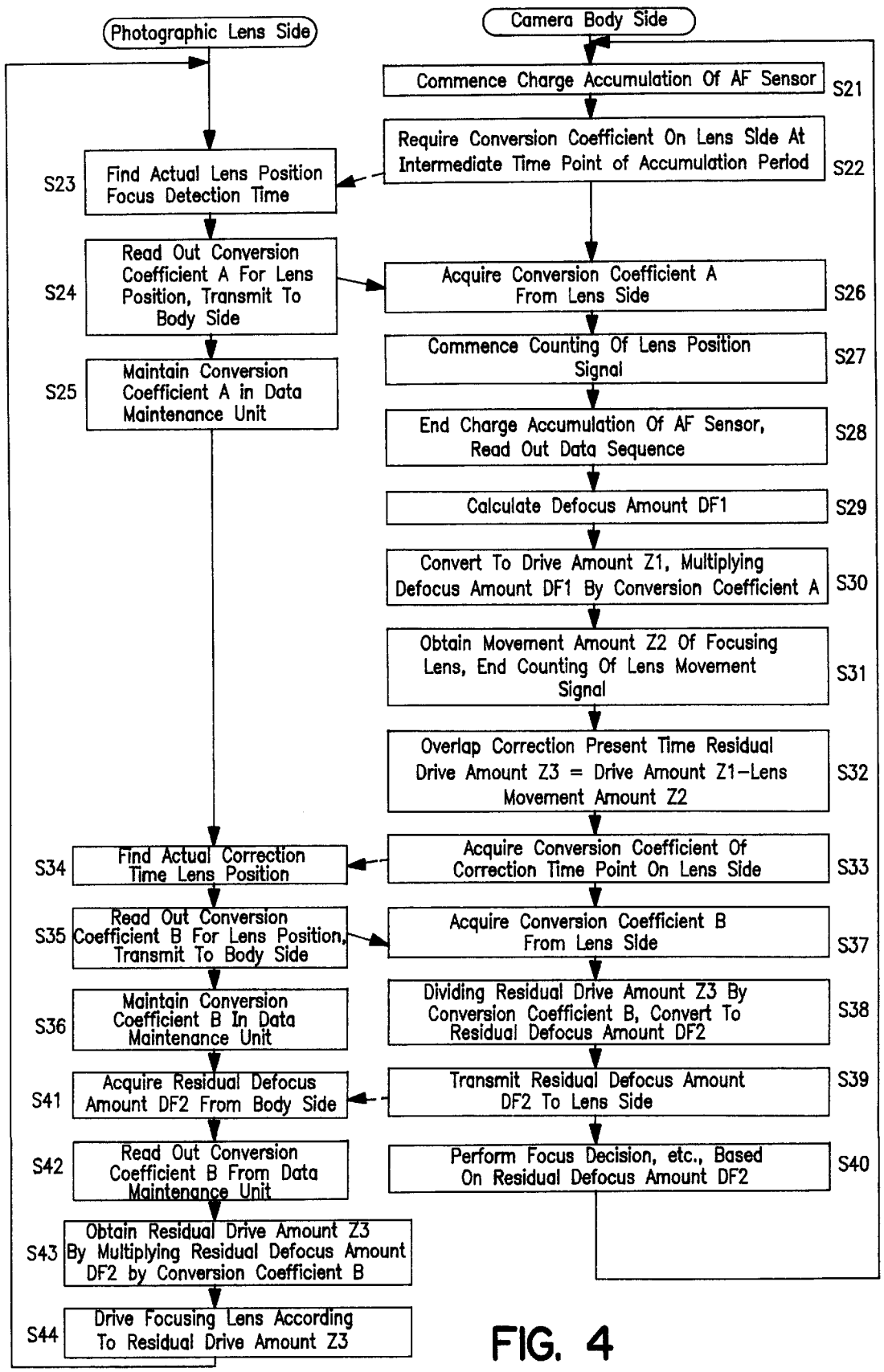
FIG. 4 is a flow chart illustrating an operational process for performing autofocus in accordance with a second embodiment of the present invention.
Figure 5:
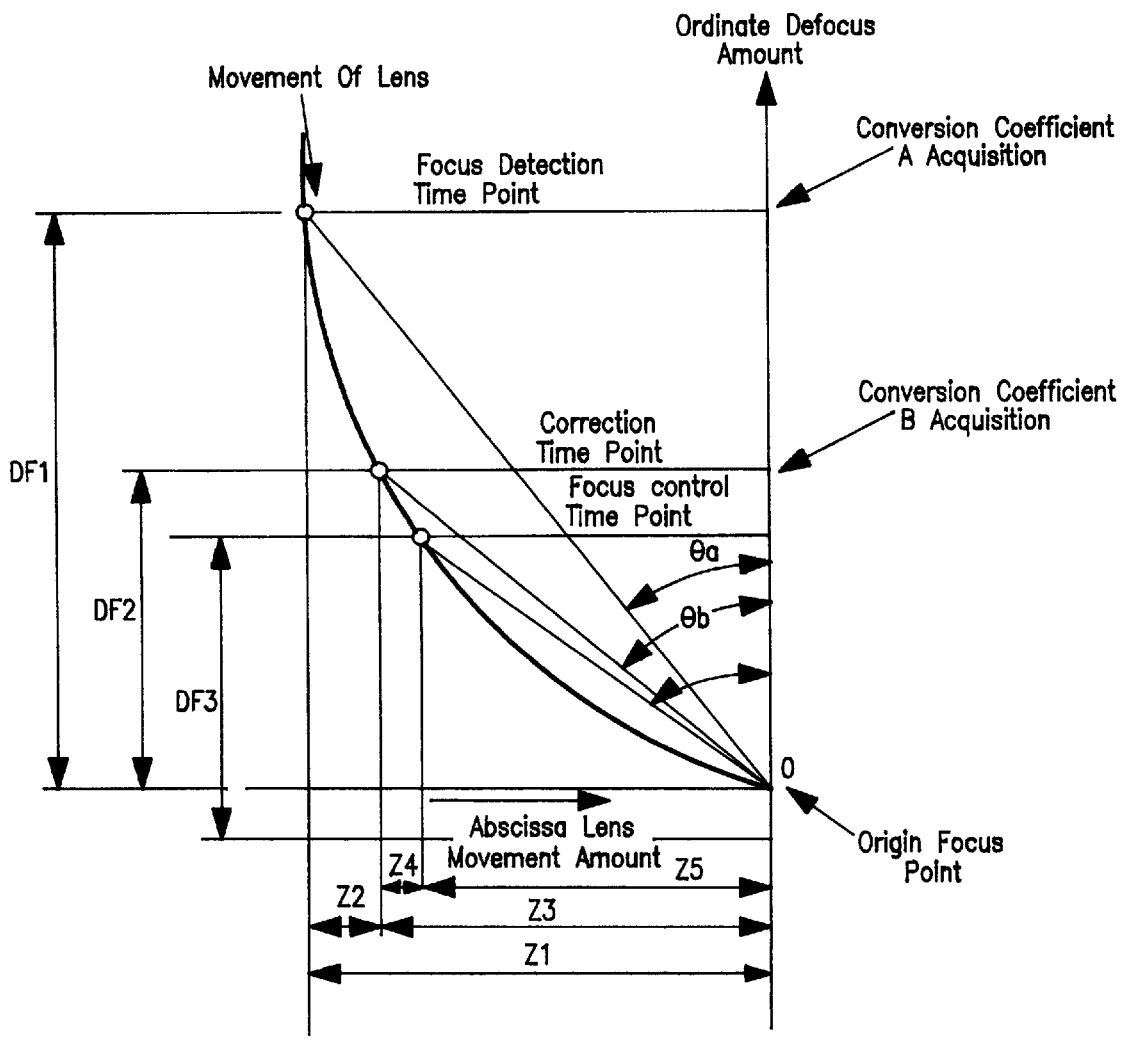
FIG. 5 is a graph illustrating the relationship between the defocus amount and the drive amount in accordance with the second embodiment of the present invention.

The second preferred embodiment of the present invention will now be described hereinbelow with reference to FIGS. 4 and 5. FIG. 4 is a flow chart illustrating an operational process for performing automatic focus control in accordance with the second preferred embodiment of the present invention. FIG. 5 is a graph showing a relationship between the defocus amount and the drive amount in accordance with the second preferred embodiment of the present invention.

Firstly, the body side control unit 21 instructs commencement of electric charge accumulation in the AF sensor 17 via the focus detection unit 19 (step S21).

At the focus detection time point, the body side control unit 21 requires a conversion coefficient for the AF control unit 37 of the photographic lens 3 side (step S22).

On the photographic lens 3 side the data selection unit 27 acquires the lens positions of the focusing lens 5 and the zoom lens 7 from the lens position detection unit 23 to determine the conversion coefficient (step S23).

The data selection unit 27 determines a conversion coefficient A for the lens positions at the focus detection time point based on the lens positions, referring to the data table in the memory 29. The conversion coefficient A is then transmitted to the camera body 1 side via the data output unit 31 (step S24).

The data selection unit 27 temporarily maintains the value of the conversion coefficient A in the data maintenance unit 35 in parallel with such a transmission operation (step S25). Furthermore, the conversion coefficient A here is the value corresponding to the tangent value of the angle θa shown in FIG. 5.

The body side control unit 21 of the camera body 1 side acquires the conversion coefficient A and lens data other than the conversion coefficient A transmitted in the above-described manner (step S26).

In the body side control unit 21, the computation of lens movement signals which are output on occasion from the movement signal generating unit 45 begins in parallel with an operation of transmitting the conversion coefficient A (step S27).

Continuing, when a predetermined electric charge accumulation period in the AF sensor 17 ends, the focus detection unit 19 reads out from the AF sensor 17 a data series showing a pair of optical image patterns (step S28). The focus detection unit 19 performs correlation calculations on these data series, and calculates the value of the defocus amount at the time point of focus detection (step S29). The defocus amount at this time corresponds to the defocus amount DF1 shown in FIG. 5.

The body side control unit 21 then multiplies the defocus amount DF1 by the conversion coefficient A, as in Equation (5) below, to calculate the drive amount Z1 necessary to drive the focusing lens 5 to the focus point (step S30).

$$Z1 = DF1 \times A \qquad (5)$$

At this point in time, the body side control unit 21 ends counting of the pulse movement signal, and, as shown in FIG. 5, finds the lens movement amount Z2 after the focus detection time point (step S31).

Next, the body side control unit 21 determines the residual drive amount Z3 at the correction time point by subtracting the lens movement amount Z2 from the drive amount Z1, as in Equation (6) below (step S32).

$$Z3 = Z1 - Z2 \qquad (6)$$

The body side control unit 21 then acquires the conversion coefficient on the lens side at the time point (referred to hereinbelow as "correction time point") at which the correction calculations were performed (step S33).

On the photographic lens 3 side, the data selection unit 27 acquires the positions of the focusing lens 5 and the zoom lens 7 at the correction time point in accordance with the acquired lens side conversion coefficient (step S34). The data selection unit 27 then refers to the data table in the memory 29 based on these lens positions, and finds a conversion coefficient B in the lens position at the correction time point. The conversion coefficient B is transmitted to the camera body 1 side via the data output unit 31 (step S35).

In parallel with the conversion coefficient B transmission operation, the data selection unit 27 temporarily maintains the value of the conversion coefficient B in the data maintenance unit 35 (step S26). Furthermore, the conversion coefficient B is a value which corresponds to the tangent value of the angle θb, as shown in FIG. 5.

The body side control unit 21 of the camera body 1 side then acquires the conversion coefficient B transmitted in the above-described manner (step S37). Next, the body side control unit 21 converts the residual drive amount Z3 into a residual defocus amount DF2, as shown in FIG. 5, by dividing the residual drive amount Z3 by the conversion coefficient B, as in Equation (7) below (step S38).

$$DF2 = Z3/B \qquad (7)$$

The body side control unit 21 transmits the residual defocus amount DF2 to the photographic lens 3 side (step S39).

Furthermore, because the value of the residual defocus amount DF2 was converted at the correction time point using the conversion coefficient B, the residual defocus amount DF2 is an accurate residual defocus amount at the correction time point. Consequently, the body side control unit 21 executes the operations of focus decision and the like, based on the value of the residual defocus amount DF2 (step S40).

The AF control unit 37 on the photographic lens 3 side acquires the residual defocus amount DF2 from the camera body 1 side (step S41). Next, the AF control unit 37 reads out the conversion coefficient B maintained just before in the data maintenance unit 35 (step S42). Continuing, the AF control unit 37 determines a residual drive amount Z3 by multiplying the residual defocus amount DF2 by the conversion coefficient B, as in the following Equation (8) (step S43).

$$Z3 = DF2 \times B \qquad (8)$$

The lens drive unit 43 controls the AF control unit 37 to drive the focusing lens 5 in a direction which reduces the residual defocus amount Z3 (step S44).

The above operations are executed repeatedly, and at the time point when the counting result of the lens movement signal output from the movement signal generating unit 45 becomes equal to the residual defocus amount Z3, the AF control unit 37 stops the lens drive.

In accordance with the second preferred embodiment of the present invention, the operations described above produce results which are similar to those of the first preferred embodiment. Moreover, in accordance with the second preferred embodiment of the invention, because the conversion coefficient B is multiplied at the correction time point by the residual drive amount Z3, no difference can be found by the residual defocus amount DF2 at the correction time point. Accordingly, it is possible to precisely execute focus decisions and the like at the correction time point based on the residual defocus amount DF2.

Third Preferred Embodiment

A third preferred embodiment of the invention will now be described below with reference to FIG. 6. The elements described below with respect to the third preferred embodiment which are the same as or similar to those of the first preferred embodiment (FIG. 1) are referred to by the same reference numerals and a detailed description of these like elements is omitted.

Figure 6:
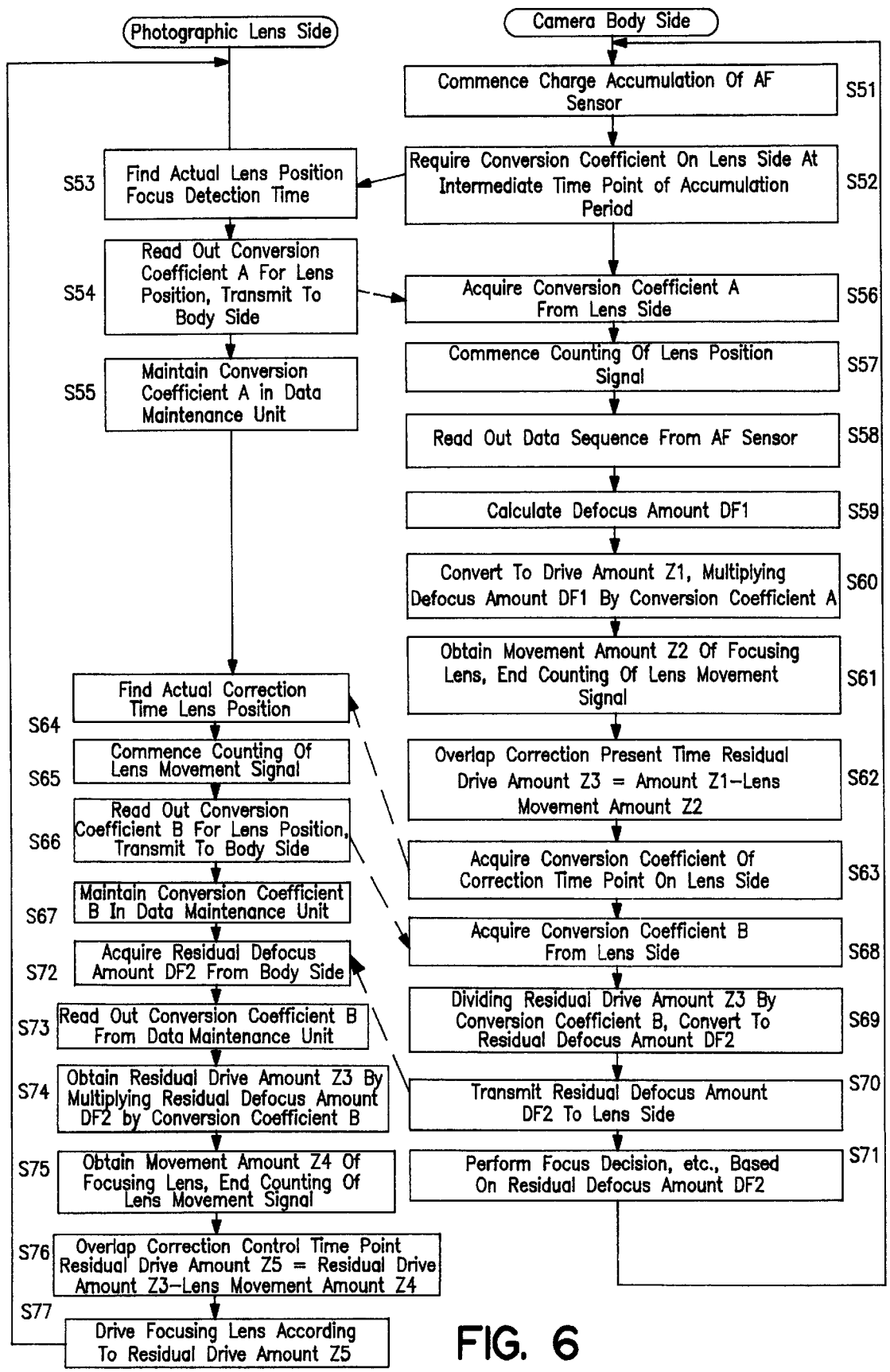
FIG. 6 is a flow chart illustrating an operational process for performing autofocus in accordance with a third embodiment of the present invention.

FIG. 6 is a flow chart illustrating an operational process for performing autofocus control in accordance with the third preferred embodiment of the invention.

Firstly, the body side control unit 21 instructs commencement of electric charge accumulation of the AF sensor 17 via the focus detection unit 19 (step S51).

At this focus detection time point, the body side control unit 21 requires the conversion coefficient for the AF control unit 37 of the photographic lens 3 side (step S52).

In accordance with the requirement for the conversion coefficient, firstly, on the photographic lens 3 side the data selection unit 27 acquires the lens positions of the focusing lens 5 and the zoom lens 7 from the lens position detection unit 23 (step S53).

Based on these lens positions, the data selection unit 27 refers to the data table in the memory 29, and determines the conversion coefficient A for the lens position at the focus detection time point. The conversion coefficient A is transmitted to the camera body 1 side via the data output unit 31 (step S54). In parallel with the operation of transmitting the conversion coefficient A to the camera body 1 side, the data selection unit 27 temporarily maintains in the data maintenance unit 35 the value of the conversion coefficient A. Furthermore, the conversion coefficient A here is a value corresponding to the tangent value of the angle θa, as shown in FIG. 5.

The body side control unit 21 of the camera body 1 side acquires the conversion coefficient A and lens data other than the conversion coefficient A transmitted in above-described manner (step S56). In parallel with the operation of transmitting the conversion coefficient A, in the body side control unit 21 counting of lens movement signals which are output on occasion from the movement signal generating unit 45 begins (step S57).

Continuing, when a predetermined electric charge accumulation period in the AF sensor 17 ends, the focus detection unit 19 reads out from the AF sensor 17 a data series indicating a pair of optical image patterns (step S58). The focus detection unit 19 performs correlation calculations on the data series, and calculates the value of the defocus amount at the time point of focus detection (step S59). The defocus amount at this time corresponds to the defocus amount DF1 in FIG. 5.

The body side control unit 21 then multiplies the defocus amount DF1 by the conversion coefficient A, as in Equation (9) below, to calculate the drive amount Z1 necessary to drive the focusing lens 5 to the focus point (step S60).

$$Z1 = DF1 \times A \quad (9)$$

At this point in time, the body side control unit 21 ends counting of the pulse movement signal, and, as shown in FIG. 5, determines the lens movement amount Z2 after the focus detection time point (step S61).

The body side control unit 21 then determines the residual drive amount Z3 at the correction time point by subtracting the lens movement amount Z2 from the drive amount Z1, as in Equation (10) below (step S62).

$$Z3 = Z1 - Z2 \quad (10)$$

Next, the body side control unit 21 acquires on the lens side the conversion coefficient at the time point (referred to hereinbelow as the "correction time point") at which the correction calculations were performed (step S63).

In accordance with the requirement for the conversion coefficient, firstly, on the photograph lens 3 side the data selection unit 27 acquires the positions of the focusing lens 5 and the zoom lens 7 at the correction time point (step S64). Moreover, from this time point, the AF control unit 37 commences counting of the lens movement signals output from the movement signal generation unit 45 (step S65).

The data selection unit 27 then refers to the data table in the memory 29, and determines a conversion coefficient B in the lens positions at the correction time point based on the lens positions. The conversion coefficient B is transmitted to the camera body 1 side via the data output unit 31 (step S66).

In parallel with the transmission of the conversion coefficient B to the camera body 1 side, the data selection unit 27 temporarily maintains the value of the conversion coefficient B in the data maintenance unit 35 (step S67). Furthermore, the conversion coefficient B is a value corresponding to the tangent value of the angle θb, as shown in FIG. 5. The body side control unit 21 of the camera body 1 side then acquires the conversion coefficient B transmitted in the above-described manner (step S68).

Next, the body side control unit 21 divides the residual drive amount Z3 by the conversion coefficient B, and converts the residual drive amount Z3 into a residual defocus amount DF2, as shown in FIG. 5, as in Equation (11) below (step S69).

$$DF2 = Z3/B \quad (7)$$

The body side control unit 21 then transmits the residual defocus amount DF2 to the photographic lens 3 side (step S70). Moreover, the body side control unit 21 executes focus decisions, and the like, based on the value of the residual defocus amount DF2 (step S71).

On the photographic lens 3 side, the AF control unit 37 acquires the residual defocus amount DF2 (step S72). The AF control unit then reads out the conversion coefficient B which was maintained just before in the data maintenance unit 35 (step S73).

Continuing, the AF control unit 37 determines a residual drive amount Z3 by multiplying the residual defocus amount DF2 by the conversion coefficient B, as in the following Equation (12) (step S74).

$$Z3 = DF2 \times B \quad (12)$$

At this time point, the AF control unit 37 temporarily ends the counting of the lens movement signals, and determines a lens movement amount Z4 after the correction time point (step S75). The AF control unit 37 determines the residual defocus amount Z5 at the focus control time point by subtracting the lens movement amount Z4 from the residual defocus amount Z3, as in Equation (13) below (step S76).

$$Z5 = Z3 - Z4 \quad (13)$$

The AF control unit 37 then drives the focusing lens 5 via the lens drive unit 43 in a direction which reduces the residual defocus amount Z5 (step S77).

The above-described operations in accordance with the third preferred embodiment are repeatedly executed and at the time point when the counting result of the lens movement signal output from the movement signal generating unit 45 becomes equal to the residual defocus amount Z5, the AF control unit 37 stops the lens drive.

In accordance with the operations described hereinabove with respect to the third preferred embodiment of the invention, results can be obtained which are similar to those of the second preferred embodiment.

Moreover, in accordance with the third preferred embodiment of the invention, by subtracting the lens movement amount Z4 after the correction time point from the residual drive amount Z3, a residual drive amount Z5 at the focus control time point can be found. Accordingly, an even more precise automatic focus control can be performed based on the residual drive amount Z5.

Moreover, in accordance with the above-described embodiments, conversion coefficients are used as a series of relational information. However, the present invention is not limited to using conversion coefficients. Generally, relational information can be used if it is information representing the relationship of the defocus amount and the drive amount.

As described hereinabove, in accordance with embodiments of the present invention, because the same relational information is invariably used in the within-lens conversion device of the photographic lens side, as is used on the camera body side, no inconsistencies occur in the residual drive amount between the body and lens. As a result, it is possible to appropriately convert the residual defocus amount, which conferred overlap correction on the camera body side, into an appropriate residual drive amount on the photographic lens side.

By executing focus control based on such an appropriate residual drive amount, high focusing accuracy and high focusing speed become possible. In particular, in accordance with the embodiments of the present invention, the second conversion device converts the residual drive amount using the relational information of the correction time point into a residual defocus amount. Because of this, by finding the residual defocus amount at the correction time point without a difference, it is possible to execute appropriate focus decisions and the like.

Although a few preferred embodiments of the present invention have been shown and described, it will be appreciated by those skilled in the art that changes may be made in these embodiments without departing from the principles and spirit of the invention, the scope of which is defined in the claims and their equivalents.

What is claimed is:

1. An auto focus system, comprising:

a camera body side including a focus detection device to detect a defocus amount of a photographic lens, a lens movement information acquisition device to acquire, from the photographic lens side, information relating to movement of a focusing lens within the photographic lens, a within-camera correction device to determine a residual defocus amount and to correct the residual defocus amount according to the movement of the focusing lens after a time point of focus detection using the information relating to the movement of the focusing lens and relational information representing a relationship between the defocus amount and the drive amount of the focusing lens, and an information transmission device to transmit to the photographic lens side the corrected residual defocus amount by the within-camera correction device; and a photographic lens side, including a within-lens conversion device to convert the residual defocus amount transmitted from the information transmission device into a residual drive amount of the focusing lens using within-lens relational information equal to the relational information used by the within-camera correction device, and a lens drive device to drive the focusing lens according to the residual drive amount converted by the within-lens conversion device.

2. An autofocus system as recited in claim 1, wherein the within-camera correction device comprises:

a first conversion device to convert the defocus amount detected by the focus detection device into the drive amount of the focusing lens using first relational information at the focus detection time point;

a residual drive amount correction device to correct the drive amount converted by the first conversion device by the movement of the focusing lens at the focusing time point and thereafter;

a second conversion device to convert the drive amount corrected by the residual drive amount correction device into a residual defocus amount using second relational information at the correction time point, wherein the within-lens conversion device converts the residual defocus amount transmitted from the information transmission device into the residual drive amount of the focusing lens using within-lens relational information equal to the second relational information used by the second conversion device.

3. A photographic lens, comprising:

a photographic optical system having a focusing lens;

a within-lens conversion device to convert a residual defocus amount acquired from a camera body side into a residual drive amount of the focusing lens using relational information representing a relationship between a defocus amount and a drive amount of the focusing lens used when determining a residual defocus amount from a defocus amount on the camera body side; and a lens drive device to drive the focusing lens according to the residual drive amount converted by the within-lens conversion device.

4. A photographic lens as recited in claim 3, wherein the within-lens conversion device converts the residual defocus amount acquired from the camera body side into the residual drive amount of the focusing lens using the relational information representing the relationship between the defocus amount and the drive amount of the focusing lens in the camera body side when converting the residual drive amount into the residual defocus amount.

5. An autofocus system which simultaneously performs an operation of detecting a defocus amount and driving a focusing lens, comprising:

a defocus correction device located in a camera body to correct a defocus amount to an extent of focusing lens movement after a defocus amount detection based on relational information representing a relationship between the defocus amount and a drive amount of the focusing lens; and a lens drive device located in a photographic lens to drive the focusing lens according to a drive amount determined based on the relational information used to correct the defocus amount.

6. An autofocus system as recited in claim 5, wherein the defocus correction device determines a residual defocus amount based on the relational information, transmits the residual defocus amount to the lens drive device, and the lens drive device drives the focusing lens based on the residual defocus amount and the relational information.

7. An autofocus system as recited in claim 6, wherein the lens drive device includes a memory to store the relational information, the defocus correction device obtains the relational information from the lens drive device at a focus detection time point, the lens drive device stores the relational information transmitted to the defocus correction device in the memory, and the lens drive device drives the focusing lens based on the stored relational information and the residual defocus amount.

8. An autofocus system as recited in claim 5, wherein the defocus correction device determines a drive amount of the focusing lens at a focus detection time point based on first relational information representing a relationship between the defocus amount of the focusing lens and a drive amount of the focusing lens at the focus detection time point, and determines a drive amount of the focusing lens at a correction time point based on second relational information representing a relationship between the defocus amount of the focusing lens and a drive amount of the focusing lens at the correction time point.

9. An autofocus system as recited in claim 5, wherein the defocus correction device comprises:
a defocus detection device to detect a defocus amount of the focusing lens; and
a correction device to correct the defocus amount according to the movement of the focusing lens after a focus detection time using the relational information.

10. An autofocus system as recited in claim 9, wherein the correction device comprises:
a conversion device to convert the detected defocus amount into a drive amount of the focusing lens at the time of focus detection based on the relational information;
a residual drive amount determination device to determine a residual drive amount at a correction time point based on the drive amount; and
a residual defocus amount determination device to determine a residual defocus amount based on the residual drive amount and the relational information.

11. An autofocus system as recited in claim 10, wherein the correction device further comprises a transmission device to transmit the residual defocus amount to the lens drive device, and wherein the lens drive device drives the focusing lens based on the the residual defocus amount and the relational information.

12. An autofocus system as recited in claim 9, wherein the correction device comprises:
a first conversion device to convert the defocus amount detected by the defocus detection device into a drive amount of the focusing lens using first relational information at a focus detection time point;
a residual drive amount correction device to correct the drive amount converted by the first conversion device by the movement of the focusing lens at a focusing time point and thereafter;
a second conversion device to convert the drive amount corrected by the residual drive amount correction device into a residual defocus amount using second relational information at a correction time point; and
a transmission device to transmit the residual defocus amount to the lens drive device, wherein the lens drive device converts the residual defocus amount transmitted from the transmission device into a residual drive amount of the focusing lens, and drives the focusing lens based on the residual drive amount.

13. An autofocus system as recited in claim 5, wherein the lens drive device comprises:
a conversion device to convert a residual defocus amount acquired from the defocus correction device into a residual drive amount of the focusing lens based on the relational information representing the relationship between the defocus amount and the drive amount of the focusing lens,
wherein the lens drive device drives the focusing lens according to the residual drive amount converted by the conversion device.

14. An autofocus system as recited in claim 5, wherein the defocus correction device comprises:
a defocus detection device to detect a defocus amount of the focusing lens;
a focusing lens movement information acquisition device to acquire, from the lens drive device, information relating to movement of the focusing lens;
a correction device to determine a residual defocus amount based on the information relating to the movement to the focusing lens and relational information representing a relationship between the defocus amount and a drive amount of the focusing lens; and
an information transmission device to transmit to the lens drive device the residual defocus amount determined by the correction device, wherein the lens drive device drives the focusing lens based on the residual defocus amount and the relational information.

15. A method of performing autofocus control in a camera system having a camera body and a photographic lens, comprising the steps of:
detecting a defocus amount of a focusing lens which is part of the photographic lens;
correcting the defocus amount based on relational information representing a relationship between the defocus amount and a drive amount of the focusing lens; and
driving the focusing lens according to a drive amount determined based on the relational information used to correct the defocus amount.

16. A method as recited in claim 15, wherein the step of correcting the defocus amount comprises:
converting the detected defocus amount into a drive amount of the focusing lens at a time of focus detection;
determining a residual drive amount based on the drive amount; and
determining a residual defocus amount based on the residual drive amount and the relational information.

17. A method as recited in claim 15, wherein the step of driving the focusing lens comprises:
determining a residual drive amount of the focusing lens based on the corrected defocus amount and the relational information; and
driving the focusing lens according to the residual drive amount.

18. A method as recited in claim 15, wherein the step of correcting the defocus amount comprises:
converting the detected defocus amount into a drive amount of the focusing lens at the focus detection time point using first relational information representing a relationship between a defocus amount of the focusing lens and a drive amount of the focusing lens; and determining a residual drive amount of the focusing lens based on the drive amount; and converting the residual drive amount of the focusing lens into a residual defocus amount at a correction time point based on second relational information representing a relationship between the defocus amount of the focusing lens and a drive amount of the focusing lens at the correction time point.

19. A method as recited in claim 15, wherein the step of correcting comprises:

determining a residual defocus amount based on the relational information and the drive amount of the focusing lens; and the step of driving the focusing lens comprises:

acquiring the residual defocus amount;

converting the residual defocus amount into a residual drive amount of the focusing lens based on the relational information; and driving the focusing lens according to the residual drive amount.

20. An autofocus system in a camera having a focusing lens, comprising:

means, located in a camera body, for correcting a defocus amount of the focusing lens based on relational information representing a relationship between a defocus amount of the focusing lens and a drive amount of the focusing lens; and means, located in a photographic lens, to drive the focusing lens based on the relational information used to correct the defocus amount.

* * * * *